(12) United States Patent
Baladhandapani et al.

(10) Patent No.: US 11,636,768 B2
(45) Date of Patent: Apr. 25, 2023

(54) SYSTEM AND METHOD FOR PREDICTING OWNSHIP CLEARANCE AND TIMING BY MODELLING CONTROLLER PILOT CONVERSATIONS

(71) Applicant: HONEYWELL INTERNATIONAL INC., Charlotte, NC (US)

(72) Inventors: Gobinathan Baladhandapani, Madurai (IN); Hariharan Saptharishi, Madurai (IN); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 165 days.

(21) Appl. No.: 17/159,253

(22) Filed: Jan. 27, 2021

(65) Prior Publication Data
US 2022/0180756 A1    Jun. 9, 2022

(30) Foreign Application Priority Data
Dec. 9, 2020    (IN) .............................. 202011053535

(51) Int. Cl.
*G08G 5/00* (2006.01)
*B64D 45/00* (2006.01)
*H04B 7/185* (2006.01)

(52) U.S. Cl.
CPC .......... *G08G 5/0021* (2013.01); *B64D 45/00* (2013.01); *G08G 5/0013* (2013.01); *H04B 7/18506* (2013.01)

(58) Field of Classification Search
CPC .. G08G 5/0021; G08G 5/0013; G08G 5/0026; G08G 5/0052; B64D 45/00; H04B 7/18506
See application file for complete search history.

(56) References Cited

U.S. PATENT DOCUMENTS 6,828,921 B2    12/2004    Brown et al.
8,255,147 B2    8/2012    Roberts et al.
(Continued)

FOREIGN PATENT DOCUMENTS

JP    4082858 B2 *    4/2008    ............. G06Q 20/20

OTHER PUBLICATIONS

English translation of JP-4082858-B2 (Year: 2008).*
(Continued)

*Primary Examiner* — Shon G Foley
(74) *Attorney, Agent, or Firm* — Lorenz & Kopf, LLP

(57) ABSTRACT

A system for predicting the timing for ownship clearance instructions is provided. The system is configured to: collect communications between air traffic control (ATC) and other aerial vehicles; group the collected communications; derive an average time between successive instructions from ATC to an aerial vehicle; derive an average time for a following instruction in a specific time interval; generate a clearance instruction prediction model that is configured to predict a time by which an ownship will receive a subsequence clearance instruction, based on the average time between successive instructions from ATC to an aerial vehicle, the average time for a following instruction in a specific time interval, and the clearances provided by ATC to other aerial vehicles; predict, using the clearance instruction prediction model, an expected time for a next clearance instruction from ATC; and cause the predicted time for the next clearance instruction to be displayed on a display device.

20 Claims, 5 Drawing Sheets

(56) References Cited

U.S. PATENT DOCUMENTS

| | | |
|---|---|---|
| 8,271,184 B2 | 9/2012 | Gayraud et al. |
| 9,446,852 B2 | 9/2016 | Lacko et al. |
| 10,607,496 B2 | 3/2020 | Srinivasan et al. |
| 2010/0185426 A1* | 7/2010 | Ganesan ................ G08G 5/065 706/12 |
| 2016/0047674 A1 | 2/2016 | Ramaiah et al. |
| 2018/0225976 A1 | 8/2018 | Rinehart et al. |
| 2019/0221126 A1 | 7/2019 | Srinivasan et al. |
| 2019/0311638 A1* | 10/2019 | Srinivasan ........... G08G 5/0013 |

OTHER PUBLICATIONS

Monticone, Leone C., et al., "Modeling of Air/Ground Air Traffic Control Communications for Fast-Time Simulation," 2005 The MITRE Corporation.

\* cited by examiner

SYSTEM AND METHOD FOR PREDICTING OWNSHIP CLEARANCE AND TIMING BY MODELLING CONTROLLER PILOT CONVERSATIONS

CROSS REFERENCE TO RELATED APPLICATION

This application claims priority to Indian Provisional Patent Application No. 202011053535, filed Dec. 9, 2020, the entire content of which is incorporated by reference herein.

TECHNICAL FIELD

Embodiments of the subject matter described herein relate generally to systems and methods for presenting ATC clearance messages. More particularly, embodiments of the subject matter relate to systems and methods for predicting and displaying ATC clearance messages.

BACKGROUND

A typical problem at a busy airport for a pilot is having to wait to get a radio frequency to request or to receive an instruction from the controller. During ground operations, the flight crew has a high workload and most of the operations are dependent on controller instructions. If controller instructions are provided on time as per what the flight crew expects, then there is a smooth operation, whereas, if the instruction is delayed, the delay may disrupt flight crew planning. If an aerial vehicle is forgotten by the air traffic controller, then there are greater chances for delays and incidents.

Hence, it is desirable to provide a system and method that can monitor clearance instructions and arrive at a predicted time for the next clearance to an ownship to allow a flight crew on the ownship to appropriately plan actions in a more efficient way. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for predicting the timing for ownship clearance instructions is provided. The system includes a controller configured to: collect radio communications between air traffic control (ATC) and other aerial vehicles located in a configurable range and for a configurable duration; group the collected radio communications by aerial vehicle; derive an average time, from the collected radio communications, between successive instructions from ATC to an aerial vehicle; derive an average time, from the collected radio communications, for a following instruction in a specific time interval; generate a clearance instruction prediction model that is configured to predict a time by which an ownship will receive a subsequence clearance instruction, based on the average time between successive instructions from ATC to an aerial vehicle, the average time for a following instruction in a specific time interval, and the clearances provided by ATC to other aerial vehicles; predict, using the generated clearance instruction prediction model, an expected time for a next clearance instruction from ATC to the ownship aerial vehicle; and cause the predicted time for the next clearance instruction to be displayed on a display device.

In another embodiment, a computer-implemented method in an aerial vehicle for predicting the timing for clearance instructions is provided. The method includes: collecting radio communications between air traffic control (ATC) and other aerial vehicles located in a configurable range and for a configurable duration; grouping the collected radio communications by aerial vehicle; deriving an average time, from the collected radio communications, between successive instructions from ATC to an aerial vehicle; deriving an average time, from the collected radio communications, for a following instruction in a specific time interval; generating a clearance instruction prediction model that is configured to predict a time by which an ownship will receive a subsequence clearance instruction, based on the average time between successive instructions from ATC to an aerial vehicle, the average time for a following instruction in a specific time interval, and the clearances provided by ATC to other aerial vehicles; predicting, using the generated clearance instruction prediction model, an expected time for a next clearance instruction from ATC to the ownship aerial vehicle; and displaying the predicted time for the next clearance instruction on a display device.

In another embodiment, non-transitory computer readable media encoded with programming instructions configurable to cause one or more processors to perform a method in an aerial vehicle is provided. The method includes: collecting radio communications between air traffic control (ATC) and other aerial vehicles located in a configurable range and for a configurable duration; grouping the collected radio communications by aerial vehicle; deriving an average time, from the collected radio communications, between successive instructions from ATC to an aerial vehicle; deriving an average time, from the collected radio communications, for a following instruction in a specific time interval; generate a clearance instruction prediction model, based on the average time between successive instructions from ATC to an aerial vehicle, the average time for a following instruction in a specific time interval, any anomalies detected in aerodrome operations, and the clearances provided by ATC to other aerial vehicles, that is configured to predict a time by which an ownship will receive a subsequence clearance instruction and a reliability factor for the prediction; predicting, using the generated clearance instruction prediction model, an expected time for a next clearance instruction from ATC to the ownship aerial vehicle and an associated reliability factor for the predicted expected time; and displaying the predicted time for the next clearance instruction and the associated reliability factor on a display device.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
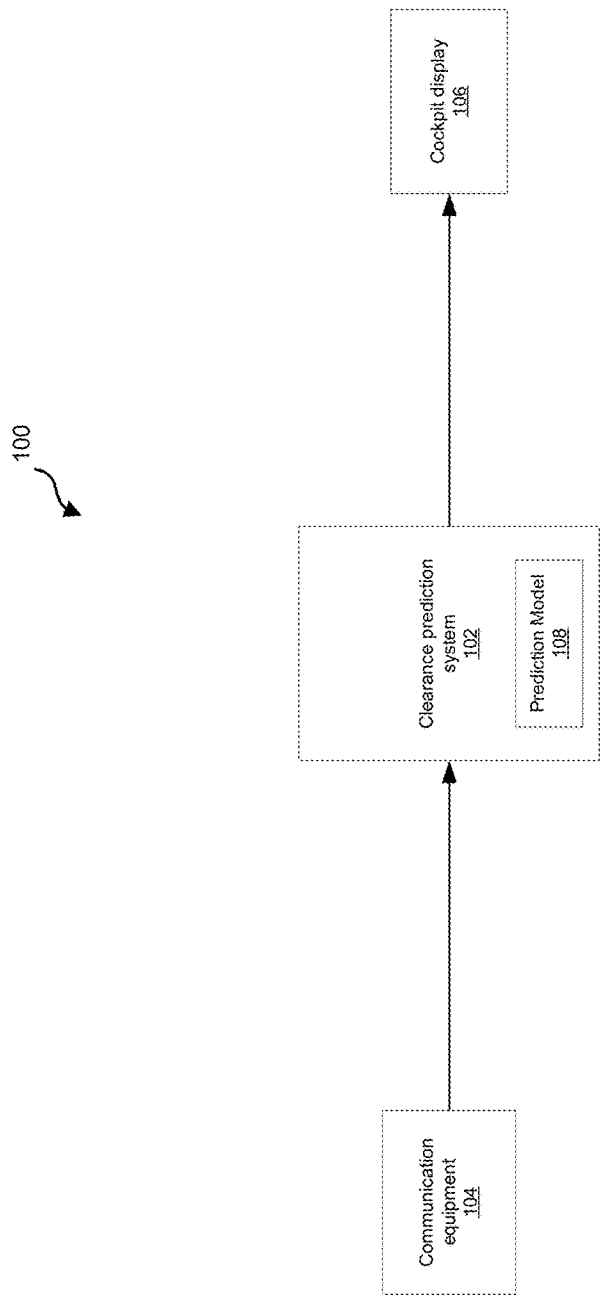
FIG. 1 is a block diagram depicting an example environment in an aerial vehicle that implements an example clearance prediction system, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, methods, and articles for providing a clearance prediction system (CPS) for monitoring clearance instructions provided by ATC (air traffic controller) to aerial vehicles within a configurable predetermined distance of an ownship, generating a prediction model based on the monitored clearance instructions that can be used to predict the next clearance instruction expected to be provided to the ownship and the timing of the next expected clearance instruction, using the prediction model to predict the next clearance instruction and the timing of the next clearance instruction to the ownship (e.g., the predicted time of next contact by ATC), and displaying the predictions to the flight crew. The disclosed apparatus, systems, techniques, methods, and articles may allow for clearance instructions provided via CPDLC (Controller Pilot Data Link Communications) and/or voice communication received via a radio channel to be monitored. When monitoring voice, the disclosed apparatus, systems, techniques, methods, and articles may use voice recognition techniques to convert the voice communication to a textual communication.

FIG. 1 is a block diagram depicting an example environment 100 in an aerial vehicle (e.g., airplane, UAV, drone, helicopter, or other aerial vehicle) that implements an example clearance prediction system (CPS) 102 that is configured to predict the next clearance instruction and the timing of the next clearance instruction to the ownship. The example environment 100 includes the CPS 102, communication equipment 104 (e.g., COM radio, CPDLC equipment, etc.), and a display device 106 (e.g., a head down display (HDD), a head up display (HUD), a primary flight display (PFD), a multifunction display (MFD), a navigation display, an electronic flight bag (EFB), a tablet computer, or other types of display devices used in an aerial vehicle cockpit or control center for the aerial vehicle).

When the CPS 102 is used with an unmanned aerial vehicle, the example environment 100 would include the CPS 102 and communication equipment 104 (e.g., COM radio, CPDLC equipment, etc.). The display device 106, in this example, would be located at a control center for the aerial vehicle that is external to the aerial vehicle.

The example CPS 102 is configured to monitor clearance instructions provided by ATC (air traffic control) to aerial vehicles within a configurable predetermined distance of an ownship via the communication equipment 104. The configurable predetermined distance may be a distance set by a flight crew member, an aerial vehicle operator, or others. The communication equipment 104 may be used to obtain clearance instructions provided via CPDLC for monitoring and/or voice communication received via a radio channel for monitoring. When monitoring voice, voice recognition techniques may be used to convert the voice communication to a textual communication.

The example CPS 102 is configured to generate a prediction model 108 based on the monitored clearance instructions. The generated prediction model 108 can be used to predict the next clearance instruction expected to be provided to the ownship and the timing of the next expected clearance instruction (e.g., the predicted time of next contact by ATC). The example CPS 102 is further configured to display the predictions (e.g., the next expected clearance instruction and the timing of the next expected clearance instruction) to the flight crew.

The example CPS 102 is implemented by a controller. The controller includes at least one processor and a non-transitory computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The non-transitory computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

In one example implementation, the example CPS 102 is configured to collect radio conversations between ATC and other aerial vehicles in a configurable range and for a configurable duration, decode voice communications into text using a speech processing engine, store the communications (e.g., CPDLC and/or decoded voice communications) in a database (as illustrated in Table 1), and derive time related parameters. The derived time related parameters may include: the average time between successive instructions to a specific aerial vehicle in communication with ATC (as illustrated in Table 2), and the average waiting time for successive instructions in a specific time interval (as illustrated in Table 3).

TABLE 1

Clearance Communications

| Time | Clearance Text | Tail |
|---|---|---|
| 104600 | CESSNA SEVEN EIGHT SEVEN WHISKEY WHISKEY DEER VALLEY TOWER SHORT DELAY APPROVED | C787WW |
| 104612 | ALRIGHT CLEARED FOR TAKEOFF SEVEN EIGHT SEVEN WHISKEY WHISKEY | C787WW |
| 104656 | CLEARED TO LAND RUNWAY SEVEN RIGHT AH FOUR DELTA BRAVO THANK YOU | A944DB |
| 104722 | CESSNA ONE SEVEN FOUR MIKE ECHO HOLD SHORT RUNWAY SEVEN RIGHT | C174M |
| 104803 | CESSNA SEVEN WHISKEY WHISKEY BEHIND ARCHER RIGHT DOWNWIND WEST APPROVED SOUTH OF ONE OH ONE | C787WW |
| 104841 | AERO FOUR DELTA BRAVO TURN RIGHT CHARLIE SEVEN CONTACT GROUND | A944DB |
| 104920 | AERO NINER SIXTY TWO WHISKEY WHISKEY DEER VALLEY TOWER HOLD SHORT OF RUNWAY SEVEN RIGHT | A962WW |

TABLE 1-continued

Clearance Communications

| Time | Clearance Text | Tail |
|---|---|---|
| 105002 | CESSNA ONE SEVEN FOUR MIKE ECHO FLY STRAIGHT OUT RUNWAY SEVEN RIGHT CHARLIE TWO CLEARED FOR TAKEOFF | C174M |
| 105042 | AERO NINER SIX TWO WHISKEY WHISKEY FLY STRAIGHT OUT RUNWAY SEVEN RIGHT CLEARED FOR TAKEOFF | A962WW |
| 105323 | ALMOST TWO AERIAL VEHICLES ONE THOSE CESSNA FIVE TWO NINER SEVEN GOLF ONLY CESSNA FIVE TWO NINER SEVEN GOLF FLY STRAIGHT OUT RUNWAY SEVEN RIGHT CLEARED FOR TAKE-OFF | C5297G |
| 105346 | CHEROKEE SIX NINER SIX SEVEN WHISKEY DEER VALLEY TOWER HOLD SHORT RUNWAY SEVEN RIGHT | C6967W |
| 105356 | CESSNA TWO ONE SEVEN ONE FOUR RUNWAY SEVEN RIGHT CLEARED TO LAND | C21714 |
| 105426 | CHEROKEE SIX SEVEN WHISKEY FLY STRAIGHT UNTIL ON THE SEVEN RIGHT CHARLIE THREE CLEARED FOR TAKEOFF | C6967W |
| 105435 | CESSNA SEVEN ONE FOUR RUNWAY SEVEN RIGHT CLEARED TO LAND | C21714 |
| 105503 | CESSNA NINER SEVEN GOLF LEFT TURN NORTHWEST APPROVED MONITOR TOWER ONE TWO ZERO POINT TWO | C5297G |
| 105610 | BELLANCA SIX FIVE SEVEN NINER NOVEMBER DEER VALLEY TOWER HOLD SHORT RUNWAY SEVEN RIGHT | B6579N |
| 105620 | CHEROKEE SIX SEVEN WHISKEY RIGHT DOWNWIND FOR THE LEFT IS APPROVED | C6967W |
| 105718 | BELLANCA SEVEN NINER NOVEMBER RUNWAY SEVEN RIGHT LINE UP AND WAIT | B6579N |
| 105749 | CESSNA ONE FOUR TURN RIGHT CHARLIE SIX CONTACT GROUND | C21714 |
| 105810 | BELLANCA SEVEN NINE NOVEMBER FLY STRAIGHT OUT RUNWAY SEVEN RIGHT CLEARED FOR TAKEOFF | B6579N |

TABLE 2

Average time for each aerial vehicle for successive calls

| Tail | Average Time difference between controller calls |
|---|---|
| A944DB | 1 min 45 secs |
| C174M | 1 min 22 secs |
| C787WW | 1 minute 8 secs, 1 min 32 secs |
| C5297G | 2 mins 40 secs |
| C6967W | 39 secs, 3 mins 4 secs |
| B6579N | 1 min 40 secs |
| C21714 | 40 secs, 1 min 54 secs |
| A962WW | 12 secs, 1 min 51 secs |

TABLE 3

Average waiting time for the specific time duration

| Time | Waiting Time |
|---|---|
| 10.40 to 10.45 | 1 min 20 secs |
| 10.45 to 10.46 | 30 secs |
| 10.47 to 10.50 | 2 mins |

In this example implementation, the example CPS 102 is further configured to watch for anomalies in aerodrome operations, such as incursion, stuck on ground, weather deteriorating, go arounds, which can add additional delay to the next clearance instruction to the aerial vehicles operating at the aerodrome, and to consider the clearance instructions given to other similarly situated aerial vehicles (e.g., other aerial vehicles that are approaching or taking off from the same aerodrome and flying a similar path as the ownship).

The example CPS 102 is configured to use the derived time related parameters, anomaly information, and clearance instructions provided to other similarly situated aerial vehicles to derive a prediction model 108 that can predict the time by which the ownship is expected to receive subsequent clearance instructions and a reliability factor that would indicate whether the time value is highly likely to be met, may be met, or not likely to be met. The example CPS 102 is configured to cause the expected clearance and its predicted time and reliability factor to be displayed to the flight crew or operator via the display device 106. This can allow the flight crew or operator to plan flight activities in a more efficient way.

The prediction model 108 may be derived using the application of machine learning techniques, such as Recurrent Neural Network, TDNN (Time Delay Neural Network), etc.

Figure 2:
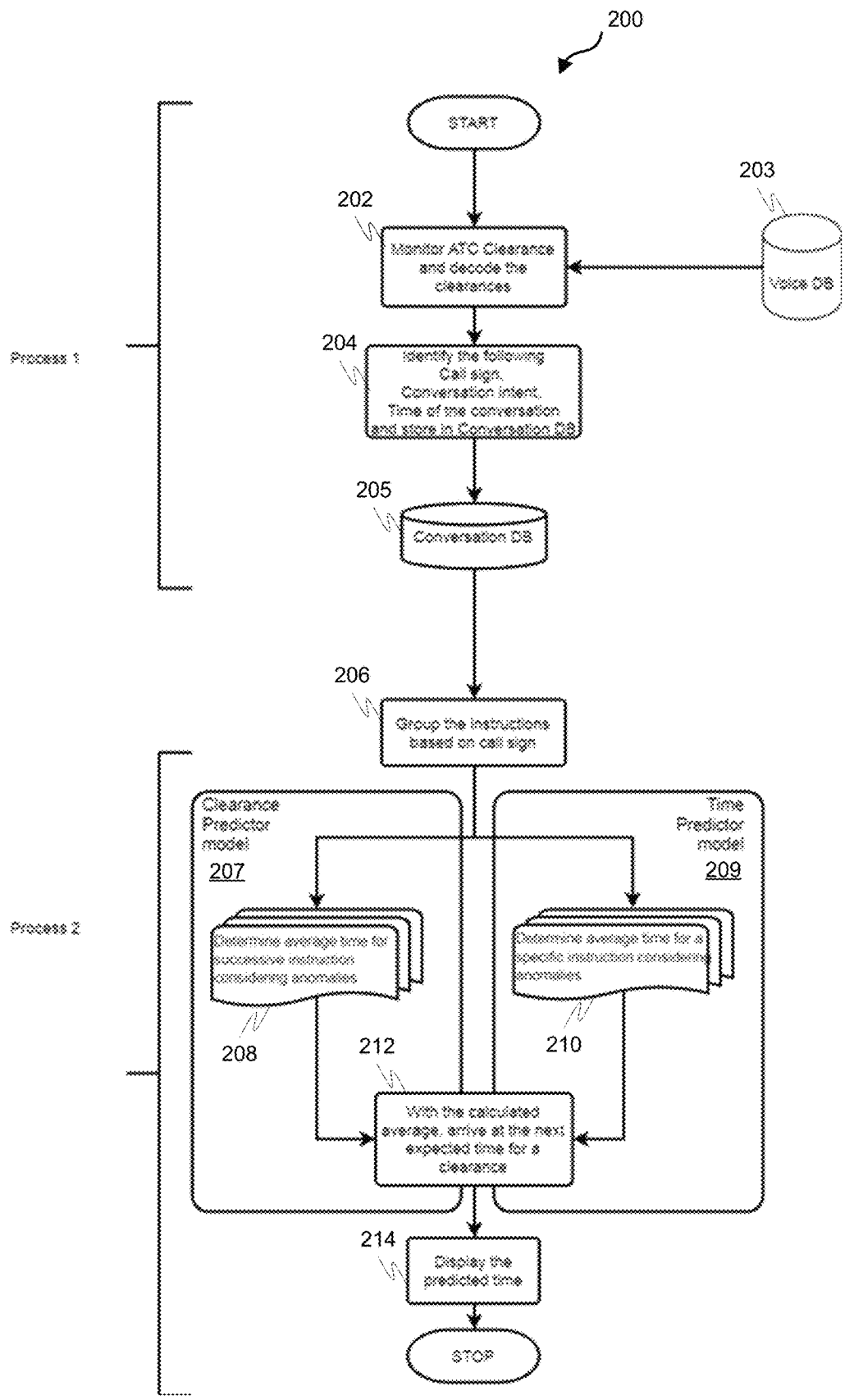
FIG. 2 is a process flow chart depicting an example process for generating a prediction model based on the monitored clearance instructions and for predicting the next expected clearance instruction and the timing of the next expected clearance instruction, in accordance with some embodiments.

FIG. 2 is a process flow chart depicting an example process 200 for generating a prediction model 108 based on the monitored clearance instructions and for predicting the next expected clearance instruction and the timing of the next expected clearance instruction. The order of operation within the process 200 is not limited to the sequential execution as illustrated in the figure, but may be performed in one or more varying orders as applicable and in accordance with the present disclosure.

The example process 200 includes monitoring ATC clearance instructions (e.g., radio and CPLDC) to other aerial vehicles located in a configurable range and for a configurable duration and decoding the clearance instructions (operation 202). Decoding may include the performance of voice recognition, e.g., using a voice database 203.

The example process 200 includes identifying relevant information from the ATC clearance instructions and storing the relevant information in a conversation database 205 (operation 204). The relevant information may include the call sign of the aerial vehicle to whom the instruction was directed, the intent of the communication, and the time of the communication.

The example process 200 includes grouping the instructions in the communication database 205 (operation 206), for example by call sign. The grouped instructions may be used to generate a model that predicts the next expected clearance instruction to the ownship and the expected time for the next expected clearance instruction.

The generated model may include a clearance predictor model 207 and a time predictor model 209 that may operate in parallel or sequentially. The clearance predictor model 207 may be configured to determine the average time for successive instructions while considering anomalies that are occurring (operation 208). The time predictor model 209 may be configured to determine the average time for a specific instruction while considering anomalies that are occurring (operation 210).

The example process 200 includes predicting the next expected clearance instruction and the expected time for the next expected clearance instruction based on the calculated average time for successive instructions and calculated average time for a specific instruction (operation 212) and displaying the next expected clearance instruction and the expected time for the next expected clearance instruction (operation 214). The next expected clearance instruction and the expected time for the next expected clearance instruction may be displayed on a cockpit display for a manned aerial vehicle or a remote display for an unmanned aerial vehicle.

Figure 3A:
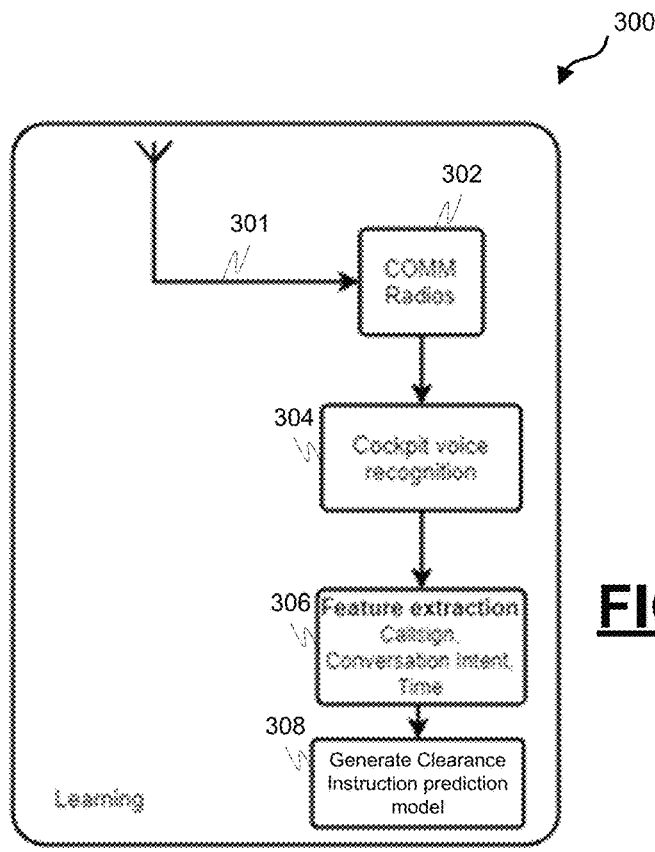
FIG. 3A is a process flow chart depicting an example process for generating a prediction model, in accordance with some embodiments.

FIG. 3A is a process flow chart depicting an example process 300 for generating a prediction model. The order of operation within the process 300 is not limited to the sequential execution as illustrated in the figure, but may be performed in one or more varying orders as applicable and in accordance with the present disclosure.

The example process 300 includes monitoring ATC clearance instructions 301 (e.g., radio and CPLDC) to other aerial vehicles located in a configurable range and for a configurable duration (operation 302) and decoding the clearance instructions using voice recognition software (operation 304).

The example process 300 includes extracting relevant features from the ATC clearance instructions including the call sign of the aerial vehicle to whom the instruction was directed, the intent of the communication, and the time of the communication (operation 306).

The example process 300 includes generating a clearance instruction prediction model that predicts the next expected clearance instruction to the ownship and the expected time for the next expected clearance instruction (operation 308). The prediction model may be generating using machine learning techniques.

Figure 3B:
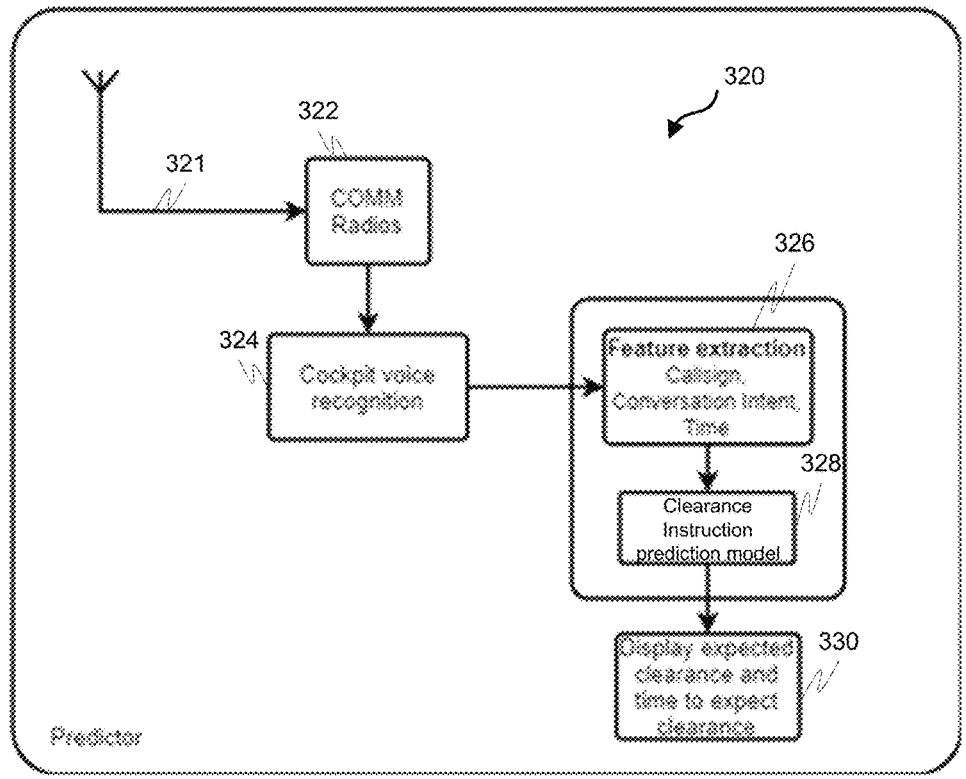
FIG. 3B is a process flow chart depicting an example process for using a clearance instruction prediction model to predict future clearance instructions, in accordance with some embodiments.

FIG. 3B is a process flow chart depicting an example process 320 for using a clearance instruction prediction model to predict future clearance instructions. The order of operation within the process 320 is not limited to the sequential execution as illustrated in the figure, but may be performed in one or more varying orders as applicable and in accordance with the present disclosure.

The example process 320 includes receiving an ATC clearance instruction 321 (operation 322) and decoding the clearance instruction using voice recognition software (operation 324).

The example process 320 includes extracting relevant features from the ATC clearance instructions, such as the call sign of the aerial vehicle to whom the instruction was directed, the intent of the communication, and the time of the communication (operation 326).

The example process 320 includes applying the clearance instruction prediction model to predict the next expected clearance instruction to the ownship and the expected time for the next expected clearance instruction (operation 328).

The example process 320 includes displaying the next expected clearance instruction to the ownship and the expected time for the next expected clearance instruction (operation 330).

Figure 4A:
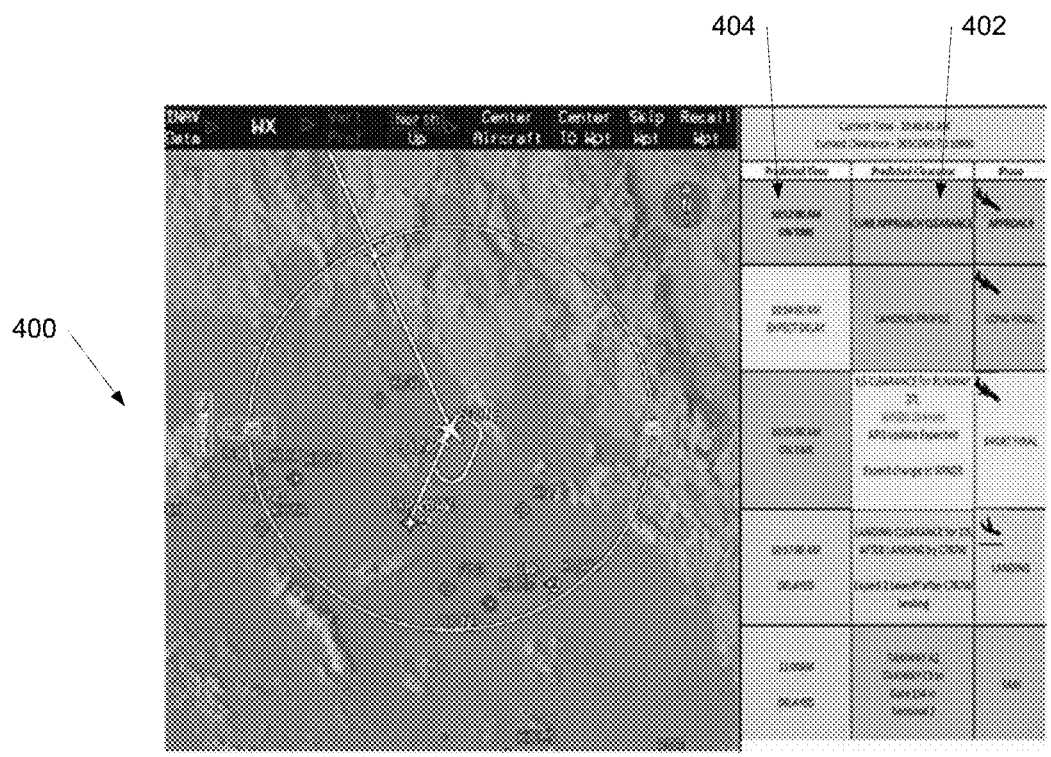
FIG. 4A is a diagram depicting an example navigational display that illustrates how a predicted clearance instruction and a time stamp associated with the predicted clearance could be displayed on the example navigational display, in accordance with some embodiments.

FIG. 4A is a diagram depicting an example navigational display 400 that illustrates how a predicted clearance instruction 402 and a time stamp 404 associated with the predicted clearance could be displayed on the example navigational display 400.

Figure 4B:
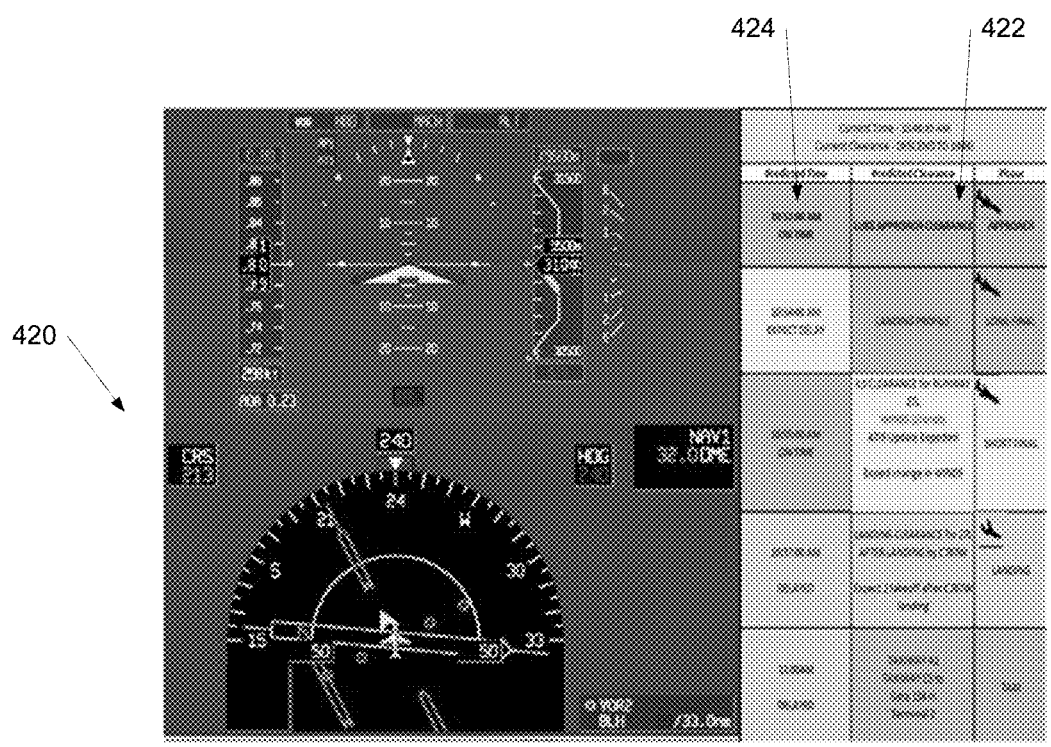
FIG. 4B is a diagram depicting an example primary flight display that illustrates how a predicted clearance instruction and a time stamp associated with the predicted clearance could be displayed on the example primary flight display, in accordance with some embodiments.

FIG. 4B is a diagram depicting an example primary flight display 420 that illustrates how a predicted clearance instruction 422 and a time stamp 424 associated with the predicted clearance could be displayed on the example primary flight display 420.

Figure 5:
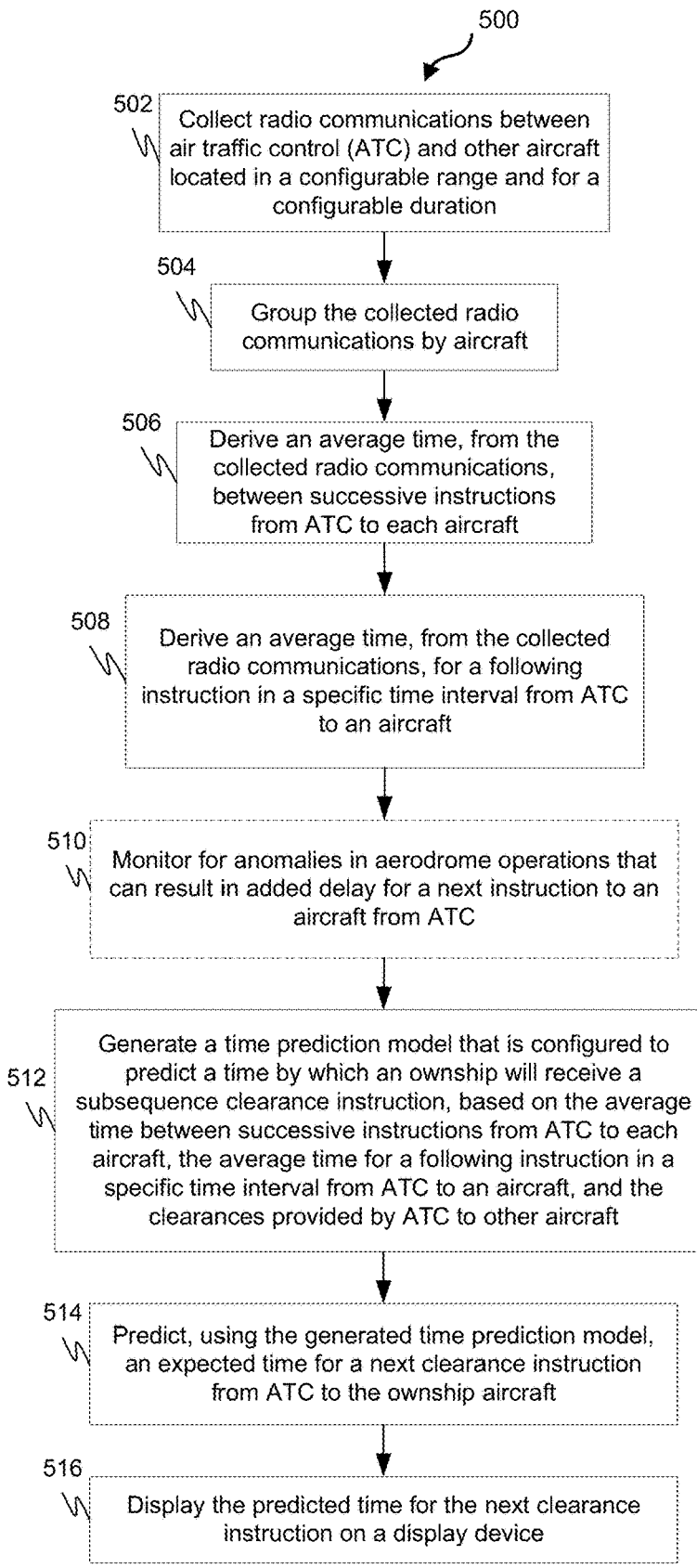
FIG. 5 is a process flow chart depicting an example process in an aerial vehicle for predicting the timing for clearance instructions, in accordance with some embodiments.

FIG. 5 is a process flow chart depicting an example process 500 in an aerial vehicle for predicting the timing for clearance instructions. The order of operation within the process 500 is not limited to the sequential execution as illustrated in the figure, but may be performed in one or more varying orders as applicable and in accordance with the present disclosure.

The example process 500 includes collecting radio communications between air traffic control (ATC) and other aerial vehicles located in a configurable range and for a configurable duration (operation 502). The collecting radio communications may also include converting voice communications from the collected radio communications into text communications using a speech processing engine and storing the collected radio communications including the converted text communications in a database.

The example process 500 includes grouping the collected radio communications by aerial vehicle (operation 504). The grouping the collected radio communications may include grouping the collected radio communications by aerial vehicle call sign. The grouping the collected radio communications may include grouping the converted text communications in a database.

The example process 500 includes deriving an average time, from the collected radio communications, between successive instructions from ATC to an aerial vehicle (operation 506). The deriving an average time, from the collected radio communications, between successive instructions from ATC to an aerial vehicle may comprise deriving an average time, from the grouped converted text communications in the database.

The example process 500 includes deriving an average time, from the collected radio communications, for a following instruction in a specific time interval (operation 508). The deriving an average time, from the collected radio communications, for a following instruction in a specific time interval may comprise deriving an average time, from the grouped converted text communications in the database.

The example process 500 may optionally include monitoring for anomalies in aerodrome operations that can result in added delay for a next instruction to an aerial vehicle from ATC (operation 510). The monitoring for anomalies may include monitoring for anomalies in aerodrome operations that include one or more of incursion, stuck on ground, weather deteriorating, and go arounds anomalies.

The example process 500 includes generating a clearance instruction prediction model that is configured to predict a time by which an ownship will receive a subsequence clearance instruction, based on the average time between successive instructions from ATC to an aerial vehicle, the average time for a following instruction in a specific time interval, and the clearances provided by ATC to other aerial vehicles (operation 512). The clearance instruction prediction model may be generating using machine learning techniques. The clearance instruction prediction model may be further configured to predict a reliability factor for the predicted time by which an ownship will receive a subsequence clearance instruction. The example process 500 may also include generating the clearance instruction prediction model based on any anomalies detected that can result in added delay for a next instruction in aerodrome operations.

The example process 500 includes predicting, using the generated clearance instruction prediction model, an expected time for a next clearance instruction from ATC to the ownship aerial vehicle (operation 514). The example process 500 may also include predicting, using the generated clearance instruction prediction model, an associated reliability factor for the predicted expected time.

The example process 500 includes displaying the predicted time for the next clearance instruction on a display device (operation 516). The example process 500 may also include displaying the associated reliability factor for the predicted time for the next clearance instruction on the display device along with the display of the predicted time for the next clearance instruction.

In one embodiment, a system for predicting the timing for ownship clearance instructions is provided. The system comprises a controller configured to: collect radio communications between air traffic control (ATC) and other aerial vehicles located in a configurable range and for a configurable duration; group the collected radio communications by aerial vehicle; derive an average time, from the collected radio communications, between successive instructions from ATC to an aerial vehicle; derive an average time, from the collected radio communications, for a following instruction in a specific time interval; generate a clearance instruction prediction model that is configured to predict a time by which an ownship will receive a subsequence clearance instruction, based on the average time between successive instructions from ATC to an aerial vehicle, the average time for a following instruction in a specific time interval, and the clearances provided by ATC to other aerial vehicles; predict, using the generated clearance instruction prediction model, an expected time for a next clearance instruction from ATC to the ownship aerial vehicle; and cause the predicted time for the next clearance instruction to be displayed on a display device.

These aspects and other embodiments may include one or more of the following features. The clearance instruction prediction model may be derived using machine learning techniques. The clearance instruction prediction model may be further configured to predict a reliability factor for the predicted time by which an ownship will receive a subsequence clearance instruction. The controller may be further configured to cause the associated reliability factor for the predicted time for the next clearance instruction to be displayed to a flight crew. The controller may be further configured to predict, using the generated clearance instruction prediction model, an associated reliability factor for the predicted expected time. The controller may be further configured to monitor for anomalies in aerodrome operations that can result in added delay for a next instruction to an aerial vehicle from ATC and the clearance instruction prediction model may be further generated based on anomalies detected that can result in added delay for a next instruction in aerodrome operations. The anomalies in aerodrome operations for which the controller may be configured to monitor may include one or more of incursion, stuck on ground, weather deteriorating, and go arounds anomalies. The controller may be further configured to: convert voice communications from the collected radio communications into text communications using a speech processing engine; and store the collected radio communications including the converted text communications in a database. To group the collected radio communications by aerial vehicle the controller may be configured to group the collected radio communications by aerial vehicle call sign.

In another embodiment, a computer-implemented method in an aerial vehicle for predicting the timing for clearance instructions is provided. The method comprises: collecting radio communications between air traffic control (ATC) and other aerial vehicles located in a configurable range and for a configurable duration; grouping the collected radio communications by aerial vehicle; deriving an average time, from the collected radio communications, between successive instructions from ATC to an aerial vehicle; deriving an average time, from the collected radio communications, for a following instruction in a specific time interval; generating a clearance instruction prediction model that is configured to predict a time by which an ownship will receive a subsequence clearance instruction, based on the average time between successive instructions from ATC to an aerial vehicle, the average time for a following instruction in a specific time interval, and the clearances provided by ATC to other aerial vehicles; predicting, using the generated clearance instruction prediction model, an expected time for a next clearance instruction from ATC to the ownship aerial vehicle; and displaying the predicted time for the next clearance instruction on a display device.

These aspects and other embodiments may include one or more of the following features. The method may further comprise generating the clearance instruction prediction model using machine learning techniques. The clearance instruction prediction model may be further configured to predict a reliability factor for the predicted time by which an ownship will receive a subsequence clearance instruction. The method may further comprise displaying the associated reliability factor for the predicted time for the next clearance instruction on the display device along with the display of the predicted time for the next clearance instruction. The method may further comprise predicting, using the generated clearance instruction prediction model, an associated reliability factor for the predicted expected time. The method may further comprise monitoring for anomalies in aerodrome operations that can result in added delay for a next instruction to an aerial vehicle from ATC and generating the clearance instruction prediction model based on anomalies detected that can result in added delay for a next instruction in aerodrome operations. The monitoring for anomalies may comprise monitoring for anomalies in aerodrome operations that include one or more of incursion, stuck on ground, weather deteriorating, and go arounds anomalies. The method may further comprise converting voice communications from the collected radio communications into text communications using a speech processing engine and storing the collected radio communications including the converted text communications in a database. The grouping the collected radio communications may comprise grouping the collected radio communications by aerial vehicle call sign.

In another embodiment, non-transitory computer readable media encoded with programming instructions configurable to cause one or more processors to perform a method in an aerial vehicle is provided. The method comprises: collecting radio communications between air traffic control (ATC) and other aerial vehicles located in a configurable range and for a configurable duration; grouping the collected radio communications by aerial vehicle; deriving an average time, from the collected radio communications, between successive instructions from ATC to an aerial vehicle; deriving an average time, from the collected radio communications, for a following instruction in a specific time interval; generate a clearance instruction prediction model, based on the average time between successive instructions from ATC to an aerial vehicle, the average time for a following instruction in a specific time interval, any anomalies detected in aerodrome operations, and the clearances provided by ATC to other aerial vehicles, that is configured to predict a time by which an ownship will receive a subsequence clearance instruction and a reliability factor for the prediction; predicting, using the generated clearance instruction prediction model, an expected time for a next clearance instruction from ATC to the ownship aerial vehicle and an associated reliability factor for the predicted expected time; and displaying the predicted time for the next clearance instruction and the associated reliability factor on a display device.

These aspects and other embodiments may include one or more of the following features. The method may further comprise generating the clearance instruction prediction model using machine learning techniques. The clearance instruction prediction model may be further configured to predict a reliability factor for the predicted time by which an ownship will receive a subsequence clearance instruction. The method may further comprise displaying the associated reliability factor for the predicted time for the next clearance instruction on the display device along with the display of the predicted time for the next clearance instruction. The method may further comprise predicting, using the generated clearance instruction prediction model, an associated reliability factor for the predicted expected time. The method may further comprise monitoring for anomalies in aerodrome operations that can result in added delay for a next instruction to an aerial vehicle from ATC and generating the clearance instruction prediction model based on anomalies detected that can result in added delay for a next instruction in aerodrome operations. The monitoring for anomalies may comprise monitoring for anomalies in aerodrome operations that include one or more of incursion, stuck on ground, weather deteriorating, and go arounds anomalies. The method may further comprise converting voice communications from the collected radio communications into text communications using a speech processing engine and storing the collected radio communications including the converted text communications in a database. The grouping the collected radio communications may comprise grouping the collected radio communications by aerial vehicle call sign.

In another embodiment, a system for predicting the timing for ownship clearance instructions is provided. The system comprises a controller configured to: collect radio communications between air traffic control (ATC) and other aerial vehicles located in a configurable range and for a configurable duration; convert voice communications from the collected radio communications into text communications using a speech processing engine; store the collected radio communications including the converted text communications in a database; group the collected radio communications by aerial vehicle call sign; derive an average time, from the collected radio communications, between successive instructions from ATC to an aerial vehicle; derive an average time, from the collected radio communications, for a following instruction in a specific time interval; monitor for anomalies in aerodrome operations, including one or more of incursion, stuck on ground, weather deteriorating, and go arounds anomalies, which can add delay for a next instruction to an aerial vehicle from ATC; generate a clearance instruction prediction model, based on the average time between successive instructions from ATC to an aerial vehicle, the average time for a following instruction in a specific time interval, any anomalies detected in aerodrome operations, and the clearances provided by ATC to other aerial vehicles, that is configured to predict a time by which an ownship will receive a subsequence clearance instruction and a reliability factor for the prediction; predict, using the generated clearance instruction prediction model, an expected time for a next clearance instruction from ATC to the ownship aerial vehicle and an associated reliability factor for the predicted expected time; and cause the predicted time for the next clearance instruction and the associated reliability factor to be displayed to a flight crew.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for predicting the timing for ownship clearance instructions, the system comprising a controller configured to:
   collect radio communications between air traffic control (ATC) and other aerial vehicles located in a configurable range and for a configurable duration;
   group the collected radio communications by aerial vehicle;
   derive an average time, from the collected radio communications, between successive instructions from ATC to an aerial vehicle;
   derive an average time, from the collected radio communications, for a following instruction in a specific time interval;
   generate a clearance instruction prediction model using machine learning techniques that is configured to predict a time by which an ownship will receive a subsequence clearance instruction, based on the average time between successive instructions from ATC to an aerial vehicle, the average time for a following instruction in a specific time interval, and the clearances provided by ATC to other aerial vehicles;
   predict, using the generated clearance instruction prediction model, an expected time for a next clearance instruction from ATC to the ownship aerial vehicle; and
   cause the predicted time for the next clearance instruction to be displayed on a display device.

2. The system of claim 1, wherein the clearance instruction prediction model is further configured to predict a reliability factor for the predicted time by which an ownship will receive a subsequence clearance instruction.

3. The system of claim 2, wherein the controller is further configured to cause the associated reliability factor for the predicted time for the next clearance instruction to be displayed to a flight crew.

4. The system of claim 3, wherein the controller is further configured to predict, using the generated clearance instruction prediction model, an associated reliability factor for the predicted expected time.

5. The system of claim 1, wherein the controller is further configured to monitor for anomalies in aerodrome operations that can result in added delay for a next instruction to an aerial vehicle from ATC and wherein the clearance instruction prediction model is further generated based on any anomalies detected that can result in added delay for a next instruction in aerodrome operations.

6. The system of claim 5, wherein the anomalies in aerodrome operations for which the controller is configured to monitor include one or more of incursion, stuck on ground, weather deteriorating, and go arounds anomalies.

7. The system of claim 1, wherein the controller is further configured to:
convert voice communications from the collected radio communications into text communications using a speech processing engine; and
store the collected radio communications including the converted text communications in a database.

8. The system of claim 1, wherein to group the collected radio communications by aerial vehicle the controller is configured to group the collected radio communications by aerial vehicle call sign.

9. A computer-implemented method in an aerial vehicle for predicting the timing for clearance instructions, the method comprising:
collecting radio communications between air traffic control (ATC) and other aerial vehicles located in a configurable range and for a configurable duration;
grouping the collected radio communications by aerial vehicle;
deriving an average time, from the collected radio communications, between successive instructions from ATC to an aerial vehicle;
deriving an average time, from the collected radio communications, for a following instruction in a specific time interval;
generating a clearance instruction prediction model using machine learning techniques that is configured to predict a time by which an ownship will receive a subsequence clearance instruction, based on the average time between successive instructions from ATC to an aerial vehicle, the average time for a following instruction in a specific time interval, and the clearances provided by ATC to other aerial vehicles;
predicting, using the generated clearance instruction prediction model, an expected time for a next clearance instruction from ATC to the ownship aerial vehicle; and
displaying the predicted time for the next clearance instruction on a display device.

10. The method of claim 9, wherein the clearance instruction prediction model is further configured to predict a reliability factor for the predicted time by which an ownship will receive a subsequence clearance instruction.

11. The method of claim 10, further comprising displaying the associated reliability factor for the predicted time for the next clearance instruction on the display device along with the display of the predicted time for the next clearance instruction.

12. The method of claim 11, further comprising predicting, using the generated clearance instruction prediction model, an associated reliability factor for the predicted expected time.

13. The method of claim 9, further comprising monitoring for anomalies in aerodrome operations that can result in added delay for a next instruction to an aerial vehicle from ATC and generating the clearance instruction prediction model based on any anomalies detected that can result in added delay for a next instruction in aerodrome operations.

14. The method of claim 13, wherein the monitoring for anomalies comprises monitoring for anomalies in aerodrome operations that include one or more of incursion, stuck on ground, weather deteriorating, and go arounds anomalies.

15. The method of claim 9, further comprising:
converting voice communications from the collected radio communications into text communications using a speech processing engine; and
storing the collected radio communications including the converted text communications in a database.

16. The method of claim 9, wherein the grouping the collected radio communications comprises grouping the collected radio communications by aerial vehicle call sign.

17. Non-transitory computer readable media encoded with programming instructions configurable to cause one or more processors to perform a method in an aerial vehicle, the method comprising:
collecting radio communications between air traffic control (ATC) and other aerial vehicles located in a configurable range and for a configurable duration;
grouping the collected radio communications by aerial vehicle;
deriving an average time, from the collected radio communications, between successive instructions from ATC to an aerial vehicle;
deriving an average time, from the collected radio communications, for a following instruction in a specific time interval;
generating a clearance instruction prediction model using machine learning techniques, based on the average time between successive instructions from ATC to an aerial vehicle, the average time for a following instruction in a specific time interval, any anomalies detected in aerodrome operations, and the clearances provided by ATC to other aerial vehicles, that is configured to predict a time by which an ownship will receive a subsequence clearance instruction and a reliability factor for the prediction;
predicting, using the generated clearance instruction prediction model, an expected time for a next clearance instruction from ATC to the ownship aerial vehicle and an associated reliability factor for the predicted expected time; and
displaying the predicted time for the next clearance instruction and the associated reliability factor on a display device.

18. The non-transitory computer readable media of claim 17, wherein the clearance instruction prediction model is further configured to predict a reliability factor for the predicted time by which an ownship will receive a subsequence clearance instruction.

19. The non-transitory computer readable media of claim 18, wherein the method further comprises displaying the associated reliability factor for the predicted time for the next clearance instruction on the display device along with the display of the predicted time for the next clearance instruction.

20. The non-transitory computer readable media of claim 19, wherein the method further comprises predicting, using the generated clearance instruction prediction model, an associated reliability factor for the predicted expected time.

\* \* \* \* \*